Figure 1:
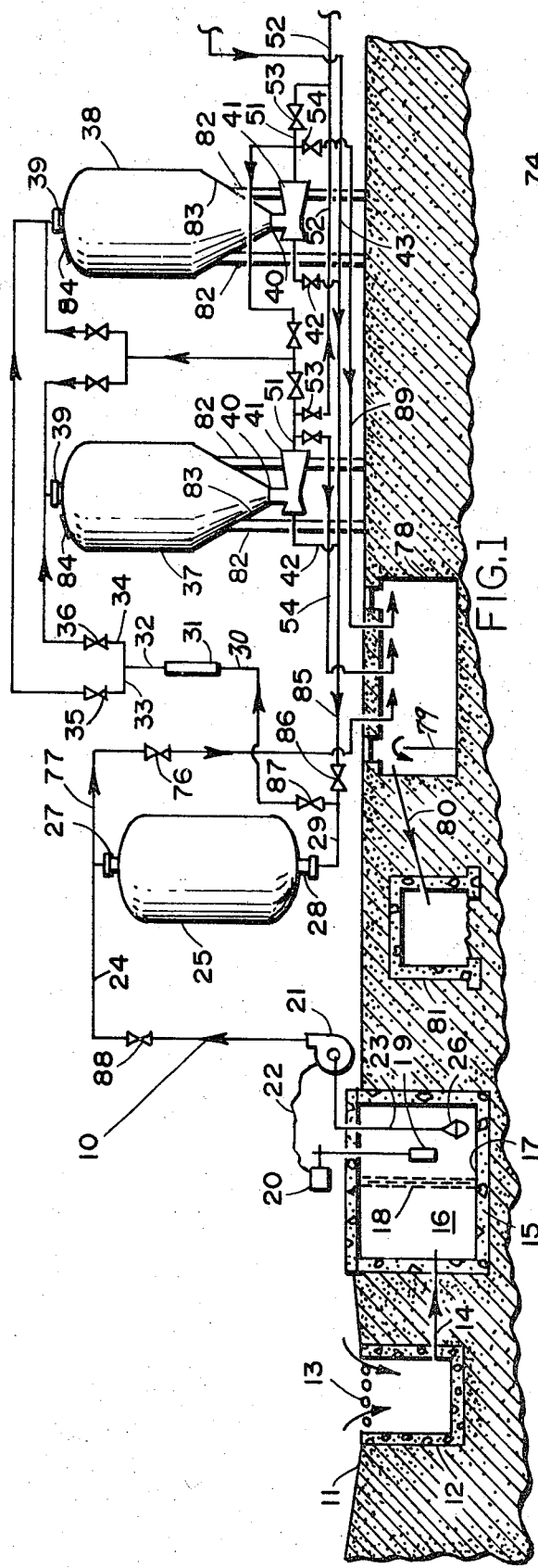

United States Patent

[11] 3,550,778

[72] Inventor Gussie Kesselman
North Miami Beach, Fla.
[21] Appl. No. 817,950
[22] Filed Apr. 21, 1969
[45] Patented Dec. 29, 1970
[73] Assignees Gussie Kesselman
a part interest. by mesne assignment;
Charles Brenner
North Miami Beach, Fla., a part interest.
by mesne assignment

[54] WASTE WATER RECLAMATION SYSTEM
3 Claims, 2 Drawing Figs.
[52] U.S. Cl. .................................................. 210/167
[51] Int. Cl. .................................................. C02b 5/00
[50] Field of Search .......................................... 210/167;
134/111, 45, 123; 15/3, 3.51, 21

[56] References Cited
UNITED STATES PATENTS
2,922,173  1/1960  Lind et al. .................. 210/167X
3,384,239  5/1968  Belardi ....................... 210/167X Primary Examiner—Reuben Friedman
Assistant Examiner—T. A. Granger
Attorney—Salvatore G. Militana ABSTRACT: A waste water reclamation system for car wash installations having a catch basin, a lint removing trap and sand filter tank receiving the waste water from the catch basin in sequence for removing the solids from the waste water, a pair of carbon filter tanks for purifying the water, the pair of carbon filter tanks being connected so as to be used in sequence, in parallel or singly in the system and a clear well for collecting the purified water for reuse or for softening and heating prior to reusing.

PATENTED DEC 29 1970 3,550,778

INVENTOR
GUSSIE KESSELMAN
BY
Salvatore G. Militana,
attorney.

WASTE WATER RECLAMATION SYSTEM

This invention relates to the reclamation of waste water and is more particularly directed to a waste water reclamation system for automatic car wash installations.

A principal object of the present invention is to provide a waste water reclamation system for car wash installations which produces reusable water automatically, economically and efficiently.

Another object of the present invention is to provide a waste water reclamation system for car wash installations which treats water containing detergents, oil, grease, gasoline and other pollutants into reusable wash water at extremely low maintenance cost.

A further object of the present invention is to provide a waste water reclamation system for car wash installations whose efficiency is conservatively found to be greater than 90 percent for detergents as measured by Alkyl Benzene Sulfonate, over 90 percent (biochemical oxygen demand) BOD and 90 percent (chemical oxygen demand) COD.

With these and other objects in view, the invention will be best understood from a consideration of the following detailed joining taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 2:
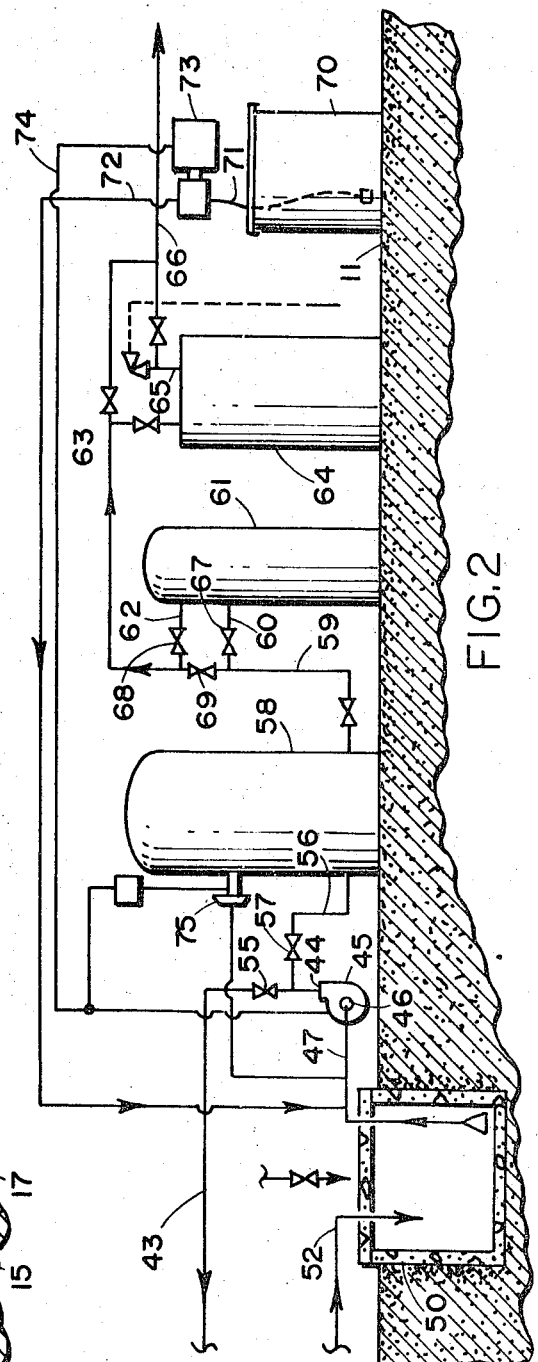

In the drawing:

FIGS. 1 and 2 are schematic diagrams of my waste water reclamation system, the pipes on the right of FIG. 1 joining the pipes on the left of FIG. 2.

Referring to the drawing wherein like numerals are used to designate similar parts throughout the several views the numeral 10 refers to the entire system as shown by FIG. 1 as joined at its led left side to the right side of FIG. 2 some of the parts thereof being mounted above ground level 11 and some being buried below ground level 11. Since my system is directed primarily to reclaiming waste water from a car washes, a catch basin 12 is positioned in the ground at a low point in the wash bay ground 11 so that waste water used in washing cars flows along the ground 11 and into the catch basin 12 through the grating 13. The waste water flowing into the catch basin 12 contains detergents, oil, grease, gasoline, dirt and other pollutants which my system will remove more than 90 percent thereof and will flow by gravity through a pipeline 14 to a tank 15 also mounted below ground level 11.

The tank 15 is separated into a sump 16 and pump well 17 by a plurality of lint screens 18 extending vertically across approximately the middle of the underground tank 15. The effluent from the catch basin 12 flows into the sump 16 and then through the screens 18 wherein the lint and other solid particles in the water are removed therefrom, the screened water collecting in the pump well 17. Mounted in the pump well 17 is a float 19 connected to a conventional float switch 20 so that when the water rises to a certain level in the pump well 17 the float 19 energizes the float switch 20. The float switch 20 in turn is connected by conduit 22 to a waste pump 21 so that upon the switch 20 being energized, the pump 21 is actuated to pump waste water from the pump well 17 through the pipes 23 and 24 into the sand and gravel filter tank 25. At the suction end of the pipe 23 there are a strainer 26 to strain the waste water of any solids therein and a conventional foot valve (not shown) to prevent the reverse flow of waste water from the sand and gravel tank 25 when the pump 21 is not in operation. The waste water enters the sand and gravel tank 25 at the inlet 27 an after being filtered through sand and gravel contained in the tank 25 leaves at the lower end as at the outlet 28 with all of its solid matter removed therefrom. The outlet 28 is connected to pipe 29 permits the flow of effluent to pipe 30 which extends to a water flow meter 31 whose outlet 32 is connected to a pair of branch pipes 33 and 34 having valve 35 and 36 that control the flow of waste water to either or both of the carbon filter tanks 37 and 38 wi which purify the water of the remaining impurities therein.

The inlet duct 39 of the filter tanks 37 and 38 is positioned at the top portion while outlet 40 which is mounted at the lowermost portion of each of the carbon filter tanks 37 and 38 is connected to ejectors 41. The ejectors 41 are connected at their inlet end to a pipe 42 which connects with pipe 43 that extends to the outlet 44 of a centrifugal pump 45 whose inlet 46 is connected to a pipe 47. The pipe 47 extends to the bottom portion of a clearwell tank 50.

The outlet of the ejectors 41 are connected to pipes 51, both of which are connected to pipe 52 that empties into the clearwell tank 50 with valves 53 controlling the flow of water thereto. A valve 55 positioned in the pipeline 43, when closed permits the flow of water from the clearwell 50 to the pressure tank 58 through pipe 56 wherein a valve 57 is positioned. The pressure tank 58 discharges the water through the pipeline 59 and into branch line 60 to be discharged into a water softener tank 61. The outlet of the water softener tank 61 is connected to a pipe 62 which communicates with pipe 63 to discharge the softened water into a water heater 64 whose outlet 65 is connected to a pipe 66 that directs the reclaimed water to the car washing units. Manipulation of the valves 67, 68 and 69 determine whether the water leaving the pressure tank 58 is to bypass the water softener tank 61 or pass therethrough a chlorine tank 70 that is provided with an outlet pipe 71 for the flow of chlorine to pipe 72 which directs the flow to the pipe 47 through which water from the clear water tank 50 flows to the inlet 46 of the pump 45. A conventional chlorinator 73 controls the amount of chlorine permitted to be discharged into the system, the chlorinator being connected by electric conduit 74 to a pressure responsive device 75 and the pump 45 so that chlorine is permitted to flow into the system only when the pump 45 is operating and the amount of chlorine being determined by the pressure in the system.

From the above indicated description it can be seen that discharge water containing grease, oil, detergent and dirt is reclaimed for reuse for car washing purposes. The used water leaving the car wash flows into the catch basin 12 and by gravity flows through the line 14 into the compartment 16 of the pump well 15. The lint and coarse particles in the water is removed from the waste water as it filters through the lint screens 18 and then is discharged by pump 21 through the pipes 23 and 24 to the sand and gravel tank 25. If it is desired that the water is not to be reclaimed, valve 76 in pipeline 77 is opened and the water will flow from the pipe 24 to pipe 77 to be discharged into a sludge settling tank 78. The latter is provided with the usual baffle 79 to prevent sludge from being discharged by the tank 77. An outlet pipe 80 discharges the waste water to a soakage pit 81 and then to a drain field (not shown) to rid the system of the waste water.

The filtered water leaving the sand and gravel tank 25 passes through pipe 29, the water flow meter 31 and then to the two carbon filter tanks 37 and 38 or to either one of these tanks. The valve arrangement permits use of one of the carbon filter tanks 37 or 38 to be used in the system while the other can be opened for the purpose of removing the activated charcoal to replace it. By disconnecting the ejector 41 at the outlet 40, the carbon particles can be readily removed by gravity from the tank. The tanks 37 and 38 are mounted on pipe supports 82 above the ground level 11, and the base of the tanks 37 and 38 are cone shaped as at 83 to permit the charcoal to be readily discharged therethrough. Manholes 84 at the top of the tanks 37 and 38 permit access to the tanks in filling them with the activated charcoal replacing the used charcoal.

The purified water after having passed through the activated charcoal in the tanks 37 and 38 are discharged through the ejector 41, through pipes 51, 52 and into the clear water tank 50. The water is then passed consecutively through a pressure tank 58 by means of the pump 45 then to the water softener tank 61, water heater 64 where it is stored until a demand is made for clear water when the water is discharged through the pipe 66 to be used at a car wash stand.

In order to remove dirt, etc. from the sand in the sand and gravel tank 25, the pipe 29 is connected to pipe 85 in which a valve 86 is positioned and opened while valve 87 in the pipeline 29 leading to the flow indicator 31 is closed and water flowing through pipe 43 will now flow past the valve 86 through discharge outlet 28 and up through the sand and gravel in the tank 25. A valve 88 in the line 24 that receives the discharge from the pump 21 is closed and valve 76 is opened so that the now dirt-carrying water leaves the top of the tank 25 at the inlet 27, flows through pipe 77 and into the sludge tank 78. Pipeline 89 which also discharges water into the sludge tank 78 is connected to the discharge pipeline 53 of the activated carbon tanks 37 and 38 to permit the discharge of the water when it is decided not to store the water in the clearwell tank 50.

It can be seen from the above description taken in connection with the schematic drawing of my system, there is shown an efficient and economical system for reclaiming car wash water so that the water may be used over and over again. The resulting water is free of detergents, oil, grease, gasoline and dirt, but no attempt is made to cause the water to be palatable or free of germs.

I claim:
1. A waste water reclamation system for car wash installations comprising a catch basin for receiving waste water, means conducting said water to a lint trap, said lint trap having screens mounted therein for removing lint from said waste water, pump means conducting said water to a sand filter tank, a flow meter and a pair of activated charcoal filter tanks, means conducting said water from said sand filter tanks through said flow meter and into each of said activated charcoal filter tanks at a top portion, each of said activated charcoal filter tanks having an inverted conical shaped a base portion, a discharge outlet at the apex of said base portion, an injector mounted at said discharge outlet, a clearwell for collecting reusable water, means conducting e water from said clearwell to said injector for discharging water from said activated charcoal filter tanks to said clearwell and water chlorinating means feeding chlorine to further purify said said water in said clearwell.

2. The structure as recited by claim 1 taken in combination with a plurality of water conducting means and valves in said system connecting said activated charcoal filter tanks whereby said last named tanks may operate in sequence, in parallel or singly in the purification of said waste water.

3. The structure as recited by claim 2 taken in combination with a pressure tank, a water softener tank, water heater and means conducting said purified water from said clearwell to each of said last named tanks.